Feb. 4, 1930. H. E. NORVIEL 1,745,807
CONTROLLER SWITCH FOR AUTOMOTIVE VEHICLES
Filed April 7, 1925  2 Sheets-Sheet 2
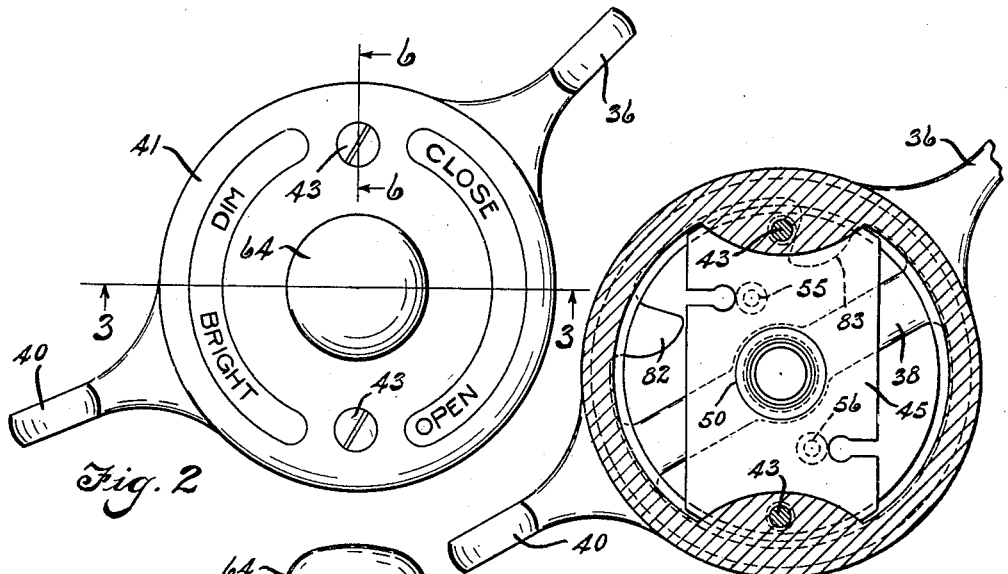
Inventor
Harry E. Norviel
By Spencer Sewall & Hardman
his Attorneys Patented Feb. 4, 1930

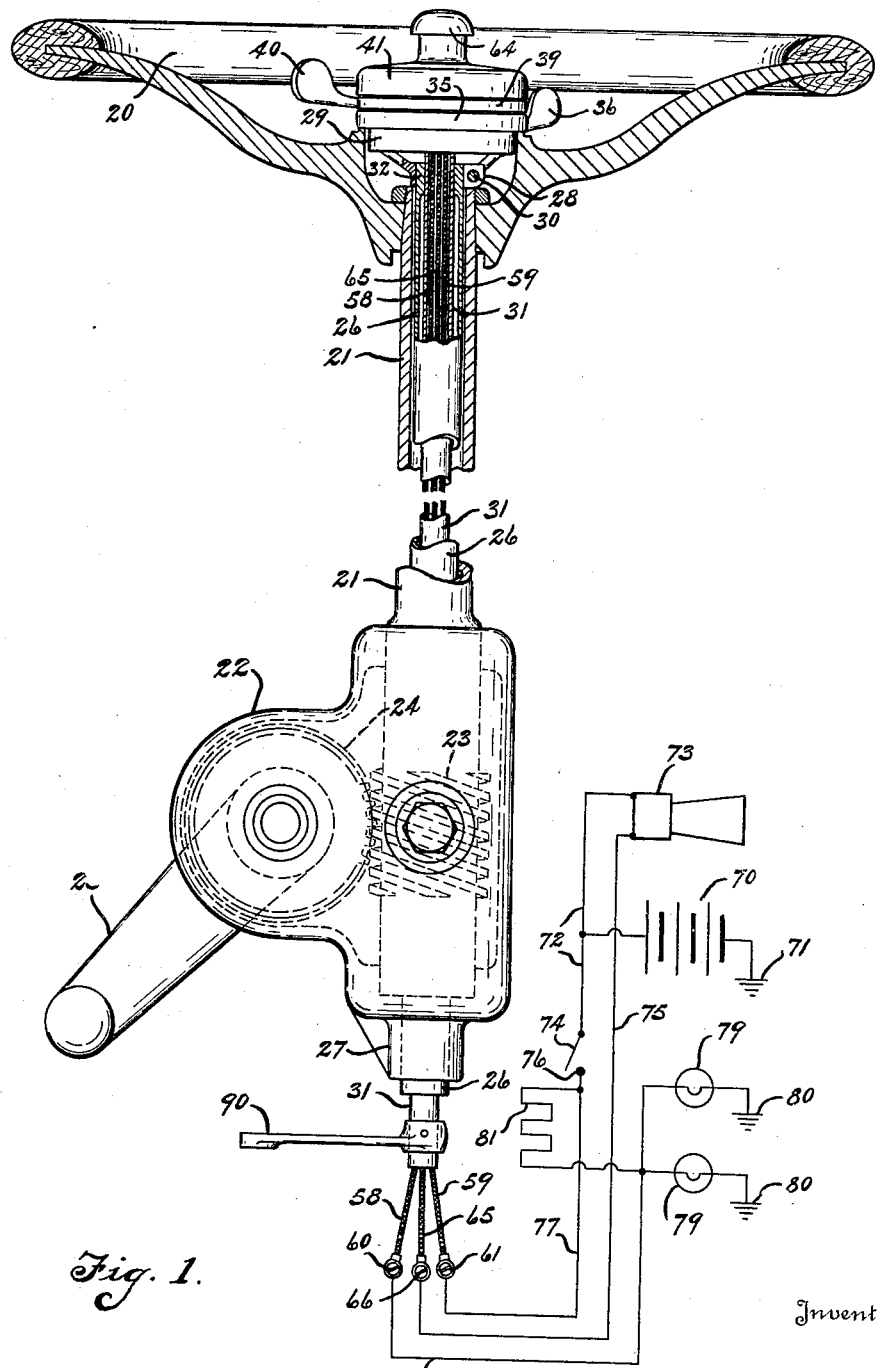

1,745,807

UNITED STATES PATENT OFFICE

HARRY E. NORVIEL, OF ANDERSON, INDIANA, ASSIGNOR, BY MESNE ASSIGNMENTS, TO DELCO-REMY CORPORATION, OF DAYTON, OHIO, A CORPORATION OF DELAWARE

CONTROLLER SWITCH FOR AUTOMOTIVE VEHICLES

Application filed April 7, 1925. Serial No. 21,443.

This invention relates to control apparatus for automobiles and particularly to devices which are mounted upon the steering column above the steering wheel for controlling electrical apparatus and for controlling the engine throttle.

One of the objects of the invention is to provide a device which is simple to operate, neat in appearance, and which may be manufactured at relatively low cost.

Further objects and advantages of the present invention will be apparent from the following description, reference being had to the accompanying drawings, wherein a preferred form of embodiment of the present invention is clearly shown.

In the drawings:

Fig. 1 is a fragmentary view partly in section of steering mechanism carrying about the steering wheel an embodiment of the present invention which is shown in side elevation.

Fig. 2 is a plan view of the control device on a larger scale than Fig. 1.

Fig. 3 is a sectional view on the line 3—3 of Fig. 2.

Fig. 4 is a sectional view on the line 4—4 of Fig. 3.

Fig. 5 is a sectional view on the line 5—5 of Fig. 3.

Fig. 6 is a sectional view on the line 6—6 of Fig. 2.

In Fig. 1 which shows a conventional type of steering apparatus, 20 designates a steering wheel attached to a steering column or tube 21 which is supported by steering gear housing 22. The column 21 carries a worm 23 meshing wth a gear 24 connected with a steering lever 25. Through the tube 21 there extends a stationary tube 26 attached at its lower end to an extension 27 of the gear housing 22. The hub 28 of a bracket 29 is clamped by a screw 30 around the upper end of the tube 26. A tube 31 extends through the tube 26 and is rotatably supported by the tube 26 by bearings such as indicated at 32. Tube 31 is attached to a hub 33 which is connected by spokes 34 with a ring 35 provided with a handle 36. The tube 31 provides a bearing for a hub 37 attached by spokes 38 to a ring 39 provided with a handle 40. A controller cover 41 having an annular flange 42 conforming to the rings 35 and 39 is attached to the bracket 29 by screws 43. The cover 41 is spaced from the bracket 29 by spacing sleeves 44 surrounding the screws 43 and by a switch contact support 45 through the ends of which the screws 43 extend. The cover 41 and the rings 35 and 39, which are preferably of aluminum, are separated by brass washers 46 and 47. A brass washer 48, which is held stationary by sleeves 44, which passes through holes in the washer 48, is maintained in frictional engagement with the underside of ring 35 by a plurality of springs 49 which are supported by the bracket 29. The springs 49 yieldingly urge the rings 35 and 39 upwardly toward the flange 42 of the cover 41 in order to apply a frictional resistance to the movements of the handles 36 and 40.

The switch contact support 45 supports a tubular member 50 which provides a bearing for a movable switch contact support 51 having notches 52 which are engaged by the spokes 38 which connects the ring 39 with the hub 37. The contact support 51 carries a movable contact 53 having contact fingers 54 for connecting stationary switch contacts 55 and 56 which are carried by the contact support 45. The contacts 55 and 56 are attached by screws 57 with wires 58 and 59, respectively. Wires 58 and 59 extend through the tube 31 and are attached to terminals 60 and 61 respectively. The cover 41 is provided with a tubular boss 62 carrying a horn switch 63 actuated by a button 64. One terminal of the horn switch is grounded on the cover 41 and the other terminal is connected by wire 65 which extends through the tube 31 with a terminal 66.

In the wiring diagram shown in Fig. 1, 70 designates a storage battery which is grounded at 71 and is connected with wire 72 leading to a horn 73 and to a switch 74. Wire 75 connects the horn 73 with the terminal 66. Switch 74 is adapted to engage a contact 76 which is connected by wire 77 with terminal 61.

Terminal 60 is connected by wire 78 with lamps 79 which are grounded at 80. A dimmer resistance element 81 is connected with wires 77 and 78. When the horn button 64 is pressed the following horn circuit will be established: battery 70, wire 72, horn 73, wire 75, terminal 66, wire 65, horn switch 63, and ground circuit through the steering gear and vehicle frame upon which the battery is grounded at 71. If it is desired to burn the lamps 79 brightly, the lever 40 is moved opposite "Bright" which is embossed on the cover 41 as shown in Fig. 2. In this position of the lever 40, the contact fingers 54 will be in engagement with the switch contacts 55 and 56. Therefore, when the switch 74 is closed the following circuit to the lamps will be established: battery 70, wire 72, switch 74, contact 76, wire 77, terminal 61, wire 59, contact 56, contact 53 contact 55, wire 58, terminal 60, wire 78, lamps 79 and ground connections 80 and 71. To dim the lights, lever 40 is moved opposite the word "Dim" shown in Fig. 2, to move the contact fingers 54 out of engagement with contacts 55 and 56. This causes the short circuit around the dimmer resistance 81 to be broken. The lamp circuit will then include battery 70, wire 72, switch 74, contact 76, resistance 81, lamps 79 and ground connections 80 and 71. Movement of lever 40 is limited by stops 82 and 83 striking against the sleeves 44. (See Fig. 5.)

The lever 36 is moved to control the engine throttle which is connected in any suitable manner with a lever 90 which is attached to the lower end of the tube 31. Suitable indicia are placed upon the cover 41 such as "Closed" and "Open" to indicate the status of the throttle for different positions of the lever 36.

The control device for the engine throttle and one of the electrical circuits of the automobile which is embodied in the present invention may be conveniently operated from the steering column. The control of the head light dimmer in this manner is very convenient as the driver is not required to reach forward to a switch on the automobile dashboard to control the dimmer resistance.

As it has been the practice heretofore, to locate the throttle control lever on the right hand side of the steering column for manipulation by the right hand of the driver, it is very easy for the driver to become accustomed to the manipulation by a similar lever located on the left hand side of the steering column to be operated by the driver's left hand. As there are no other levers for controlling the automobile on the left hand side of the steering column, the driver will find no difficulty in discovering the location of the lever 40 even while driving in the dark.

It is apparent from the drawings and description that the controller presents a very neat appearance upon the top of the steering column; and due to the simplicity of construction, it may be manufactured at relatively low cost.

While the form of embodiment of the present invention as herein disclosed, constitutes a preferred form, it is to be understood that other forms might be adopted, all coming within the scope of the claims which follow.

What is claimed is as follows:

1. A controller for an automotive vehicle, comprising in combination, a steering column, a stationary tube extending through said column and attached below the end thereof to a stationary part, a housing supported upon said stationary tube, a control member extending through said tube and into said housing a non-conducting contact support in said housing, said support having stationary contacts secured thereon, a sleeve carried by said contact support, a movable contact carrying plate rotatably supported on said sleeve, the contacts of said movable plate being adapted to be moved into engagement with the stationary contacts, and means journalled upon said control member and extending to the exterior of the housing for operating the plate.

2. A controller for an automotive vehicle, comprising in combination, a steering column, a stationary tube extending through said column and attached below the end thereof to a stationary part, a housing supported upon said stationary tube, a control member extending through said tube and into said housing, a cover for said housing, a non-conducting contact supporting member secured to said cover, stationary contacts on said member, a sleeve rigidly secured to said member, centrally thereof, an insulated plate rotatably carried by the sleeve, contact fingers secured to said plate so as to be engageable with the stationary contacts, and means journalled upon said control member and extending to the exterior of the housing and cover, for operating the rotatable plate.

3. A controller for an automotive vehicle, comprising in combination a steering column, a stationary tube extending through the steering column and attached below the end of the column to a stationary part, a housing supported upon said stationary tube, a rotatable tube extending through the stationary tube into said housing and having a lever attached thereto by means of which said tube is rotated, said rotatable tube being adapted to control a part associated with the engine of the vehicle, a lever mounted upon the rotatable tube so as to be rotatable relative thereto, said lever extending out of said housing, and an electric switch in said housing adapted to be operated by the lever.

4. A controller for an automotive vehicle, comprising in combination, a steering column, a stationary tube extending through the steering column and attached below the end of the column to a stationary part, a housing supported upon said stationary tube, a rotatable tube extending through the stationary tube into said housing and having a lever attached thereto for operating it, said rotatable tube being adapted to control a part associated with the engine of the vehicle, a ring-shaped member including a hub rotatably mounted upon the rotatable tube said ring-shaped member having a lever extending outside the housing, a plate of insulating material secured to said member, contact fingers carried on said plate and a contact support secured in the housing, having stationary contacts adapted to be engaged by the contact fingers.

5. A controller for an automotive vehicle, comprising in combination, a steering column, a stationary tube extending through the steering column and attached below the end of the column to a stationary part, a housing supported upon said stationary tube, a rotatable tube extending through the stationary tube into said housing, said rotatable tube having a lever attached thereto for operating it to control a part associated with the engine of the vehicle, a ring-shaped member including a hub rotatably mounted upon the rotatable tube, said ring-shaped member having a lever extending outside the housing, a contact support secured in the housing said support having stationary contacts mounted thereon, a sleeve rigidly carried by said support and located centrally thereof and of the rotatable tube, and a plate of insulating material rotatably mounted on said sleeve, portions of said plate being secured to the ring-shaped member, and contact fingers secured to said plate, said fingers being adapted to be moved into engagement with the stationary contacts by the operation of the said member.

6. A controller for an automotive vehicle, comprising, in combination, a stationary tube, a housing mounted upon one end of the tube, a rotatable tube extending through the stationary tube into the housing having an operating member mounted thereon within the housing for purposes of rotating said tube to control a part associated with the engine of the vehicle, a cover for the housing, an insulating plate having stationary contacts provided in the housing, clamping screws extending from the cover through the insulated plate and into the housing for securing the cover to said housing, said screws having spacer bushings surrounding them and interposed between the housing and insulating plate whereby said plate is held rigidly in position on the cover, a plate rotatably supported by the insulating plate and having contact fingers adapted to cooperate with the stationary contacts on the insulating plate, a lever rotatably supported on the rotatable tube and having portions gripped by the rotatable plate whereby said plate may be operated, and spaced extending portions on said rotatable lever adapted to engage one of the screws holding the cover upon the housing to limit the movement of said rotatable lever.

7. A controller for an automotive vehicle comprising in combination a steering column, a stationary tube extending through the steering column, a housing supported upon said tube, a rotatable member extending through the tube into said housing and having an operating control exterior of the casing, a switch lever journalled upon the rotatable member so as to be rotatable relative thereto, said lever extending out of said housing, and an electric switch in said housing adapted to be operated by the lever.

8. A controller for an automotive vehicle comprising in combination a steering column, a stationary tube extending through the steering column, a housing supported upon said tube, a rotatable member extending through the tube into said housing and having an operating control exterior of the casing, a cover for the housing, an insulating plate having stationary controls fixed to the cover, clamping screws extending from the cover through the insulated plate and into the housing for securing the cover to said housing, said screws having spacer bushings surrounding them and interposed between the housing and insulating plate whereby said plate is held rigidly in position on the cover, a plate rotatably supported by the insulating plate and having contact fingers adapted to cooperate with the stationary contacts on the insulating plate, a switch lever journalled upon the rotatable member so as to be rotatable relative thereto, said lever extending out of said housing, and an electric switch in said housing adapted to be operated by the lever.

In testimony whereof I hereto affix my signature.

HARRY E. NORVIEL.